US012590190B2

(12) United States Patent
Sawaki et al.

(10) Patent No.: US 12,590,190 B2
(45) Date of Patent: Mar. 31, 2026

(54) COATED RESIN PARTICLES AND METHOD FOR PRODUCING COATED RESIN PARTICLES

(71) Applicant: SUMITOMO SEIKA CHEMICALS CO., LTD., Kako-gun (JP)

(72) Inventors: Hiroki Sawaki, Himeji (JP); Chiho Onita, Himeji (JP)

(73) Assignee: SUMITOMO SEIKA CHEMICALS CO., LTD., Kako-gun (JP)

( * ) Notice: Subject to any disclaimer, the term of this patent is extended or adjusted under 35 U.S.C. 154(b) by 18 days.

(21) Appl. No.: 17/757,135

(22) PCT Filed: Dec. 9, 2020

(86) PCT No.: PCT/JP2020/045932
§ 371 (c)(1),
(2) Date: Jun. 9, 2022

(87) PCT Pub. No.: WO2021/117786
PCT Pub. Date: Jun. 17, 2021

(65) Prior Publication Data
US 2023/0002565 A1 Jan. 5, 2023

(30) Foreign Application Priority Data

Dec. 13, 2019 (JP) ................................. 2019-225184
Dec. 13, 2019 (JP) ................................. 2019-225185
(Continued)

(51) Int. Cl.
*C08J 3/12* (2006.01)
*B01J 20/24* (2006.01)
(Continued)

(52) U.S. Cl.
CPC .............. *C08J 3/126* (2013.01); *B01J 20/24* (2013.01); *B01J 20/26* (2013.01); *B01J 20/261* (2013.01);
(Continued)

(58) Field of Classification Search
None
See application file for complete search history.

(56) References Cited

U.S. PATENT DOCUMENTS 5,731,365 A * 3/1998 Engelhardt ................ C08J 3/12
428/407
9,982,069 B2 * 5/2018 Hinayama ............... A61L 15/60
(Continued)

FOREIGN PATENT DOCUMENTS

CA 2316342 7/1999
CN 101142259 3/2008
(Continued)

OTHER PUBLICATIONS

Machine translation JP57-168921 (Year: 2025).*
(Continued)

*Primary Examiner* — Alexandre F Ferre
(74) *Attorney, Agent, or Firm* — HSML P.C.

(57) ABSTRACT

One aspect of the present invention relates to a coated resin particle including: a water-absorbent resin particle; and a coating layer that coats at least a part of a surface of the water-absorbent resin particle, in which the coating layer contains a water-soluble component in which a solubility in 100 g of water is in a range of 1.0 g or more and 150 g or less at 25° C.

9 Claims, 2 Drawing Sheets

(a)

(b)

(30) Foreign Application Priority Data

| | | |
|---|---|---|
| Feb. 19, 2020 | (JP) | 2020-026078 |
| May 14, 2020 | (JP) | 2020-085218 |
| May 14, 2020 | (JP) | 2020-085220 |
| May 14, 2020 | (JP) | 2020-085224 |
| May 14, 2020 | (JP) | 2020-085226 |
| May 14, 2020 | (JP) | 2020-085227 |
| Jul. 17, 2020 | (JP) | 2020-122800 |

(51) Int. Cl.

| | |
|---|---|
| *B01J 20/26* | (2006.01) |
| *B01J 20/28* | (2006.01) |
| *C08F 2/08* | (2006.01) |
| *C08F 20/06* | (2006.01) |
| *C08F 120/06* | (2006.01) |
| *C08G 65/08* | (2006.01) |
| *C08J 3/16* | (2006.01) |
| *C08L 33/26* | (2006.01) |
| *C08L 101/14* | (2006.01) |

(52) U.S. Cl.

CPC ........... *B01J 20/262* (2013.01); *B01J 20/264* (2013.01); *B01J 20/265* (2013.01); *B01J 20/28* (2013.01); *B01J 20/28016* (2013.01); *C08F 2/08* (2013.01); *C08F 20/06* (2013.01); *C08F 120/06* (2013.01); *C08G 65/08* (2013.01); *C08J 3/16* (2013.01); *C08L 33/26* (2013.01); *C08L 101/14* (2013.01)

(56) References Cited

U.S. PATENT DOCUMENTS

| | | | |
|---|---|---|---|
| 2008/0269372 A1* | 10/2008 | Dairoku | C08J 3/243 523/149 |
| 2009/0105389 A1 | 4/2009 | Walden et al. | |
| 2014/0306155 A1* | 10/2014 | Tian | C08J 9/224 502/402 |

FOREIGN PATENT DOCUMENTS

| | | | | |
|---|---|---|---|---|
| EP | 0233067 | A2 | 8/1987 | |
| EP | 0233067 | B1 | 4/1990 | |
| EP | 2905072 | | 8/2015 | |
| EP | 3249002 | | 11/2017 | |
| JP | S56-115259 | | 9/1981 | |
| JP | S56-159232 | | 12/1981 | |
| JP | 57168921 | A * | 10/1982 | |
| JP | S57-168921 | | 10/1982 | |
| JP | S63-154766 | | 6/1988 | |
| JP | H1-261250 | | 10/1989 | |
| JP | H2-242858 | | 9/1990 | |
| JP | H3-285918 | | 12/1991 | |
| JP | H6-016817 | | 1/1994 | |
| JP | 2579814 | B2 | 2/1997 | |
| JP | 2002-501088 | | 1/2002 | |
| JP | 2003-183528 | | 7/2003 | |
| JP | 2007-319409 | | 12/2007 | |
| JP | 2009-203383 | | 9/2009 | |
| JP | 2010-522008 | | 7/2010 | |
| JP | 2011-178969 | | 9/2011 | |
| JP | 2016-028117 | | 2/2016 | |
| JP | 2019-031691 | | 2/2019 | |
| WO | 99/037395 | | 7/1999 | |
| WO | WO-9937395 | A1 * | 7/1999 | C08F 251/00 |
| WO | WO-03051170 | A1 * | 6/2003 | A47L 13/16 |
| WO | 2007/032565 | | 3/2007 | |
| WO | 2008/117186 | | 10/2008 | |

OTHER PUBLICATIONS

International Search Report of PCT/JP2020/045932, Mar. 16, 2021, 3 pages.

International Preliminary Report on Patentability of PCT/JP2020/045932, Jun. 23, 2022, 5 pages.

The extended European search report of European Patent Application No. 20899834.4, Nov. 9, 2023, 11 pages.

* cited by examiner (a)

(b)

COATED RESIN PARTICLES AND METHOD FOR PRODUCING COATED RESIN PARTICLES

TECHNICAL FIELD

The present invention relates to coated resin particles and a method for producing coated resin particles.

BACKGROUND ART

Water-absorbent resin particles are widely used in various fields of sanitary materials such as disposable diapers, hygiene products, and portable toilets; agricultural and horticultural materials such as water retention agents and soil improvement agents; and industrial materials such as waterproofing agents and condensation prevention agents. For the water-absorbent resin particles, it is required to control the water absorption rate in addition to the performance such as high water absorption capacity and gel strength. The water absorption rate can be controlled by varying the specific surface area of the water-absorbent resin particles and the use amount of a crosslinking agent, for example. For example, it is disclosed in paragraph [0062] of Patent Literature 1 that by subjecting a hydrogel-like substance having an internal crosslinking structure to a post-crosslinking reaction, the crosslinking density near the surface of a water-absorbent resin is increased, which increases the water absorption rate.

CITATION LIST

Patent Literature

[Patent Literature 1] JP 2016-28117 A

SUMMARY OF INVENTION

Technical Problem

Conventional water-absorbent resin particles reach a swelling state (a state in which water cannot be absorbed any more) in a relatively short time after coming into contact with a liquid to be absorbed (hereinafter, simply referred to as "liquid") such as water and urine. When the water-absorbent resin particles swell, the swelled gel-like water-absorbent resin particles fill the gap originally existing between the water-absorbent resin particles, which makes a liquid difficult to pass through the gap. This is commonly referred to as a gel blocking phenomenon. As a result, it becomes difficult for the liquid to diffuse through the gap, which is a factor causing liquid leakage. In order to prevent the gel blocking phenomenon, measures in which slowing down the water absorption rate thereof (slowing down the time in which the water-absorbent resin particles are in a swelling state, and/or, the time in which water absorption is started, for example) by changing the specific surface area of the water-absorbent resin particles and the use amount of a crosslinking agent are considered, for example. However, changing polymerization conditions of the water-absorbent resin particles are required in these measures, and finding the optimum conditions thereof is complicated.

The present invention has been made in view of such a problem, and an object thereof is to provide a coated resin particle in which the water absorption rate is controlled to be slowed down without changing polymerization conditions of a water-absorbent resin particle, and a method for producing the same.

Solution to Problem

One aspect of the present invention provides a coated resin particle including: a water-absorbent resin particle; and a coating layer that coats at least a part of a surface of the water-absorbent resin particle, in which the coating layer contains a water-soluble component in which a solubility in 100 g of water is in a range of 1.0 g or more and 150 g or less at 25° C.

Another aspect of the present invention provides a method for producing the above-mentioned coated resin particle, the method including mixing a water-absorbent resin particle, and a coating material containing a water-soluble component in which a solubility in 100 g of water is in a range of 1.0 g or more and 150 g or less at 25° C. to form a coating layer on at least a part of a surface of the water-absorbent resin particle.

Advantageous Effects of Invention

According to the present invention, a coated resin particle in which a water absorption rate is controlled to be slowed down without changing polymerization conditions of a water-absorbent resin particle, and a method for producing the coated resin particle can be provided.

DESCRIPTION OF EMBODIMENTS

Hereinafter, some embodiments of the present invention will be described in detail. However, the present invention is not limited to the following embodiments.

In the present specification, "acrylic" and "methacrylic" are collectively referred to as "(meth)acrylic". Similarly, "acrylate" and "methacrylate" are also referred to as "(meth) acrylate". In a numerical value range described in a stepwise manner in the present specification, an upper limit value or a lower limit value of a numerical value range in a certain step can be arbitrarily combined with an upper limit value or a lower limit value of a numerical value range in another step. In a numerical value range described in the present specification, an upper limit value or a lower limit value of the numerical value range may be replaced with a value shown in Examples. For materials exemplified in the present specification, one kind may be used alone, or two or more kinds may be used in combination. In a case where there are a plurality of substances corresponding to each of components in a composition, a content of each of the components in the composition means the total amount of the plurality of substances present in the composition unless otherwise specified.

[Coated Resin Particle]

(Basic Constitution of Coated Resin Particle)

A coated resin particle of the present invention includes a water-absorbent resin particle, and a coating layer that coats at least a part of a surface of the water-absorbent resin particle. The coating layer contains a water-soluble component in which a solubility in 100 g of water is in a range of 1.0 g or more and 150 g or less at 25° C.

The coating layer is preferably chemically and/or physically bonded to the surface of the water-absorbent resin particle so that the water-absorbent resin particle does not easily fall off from the water-absorbent resin particle in the state before water absorption. The physical bond is realized by an anchor effect caused by the coating layer entering a fine recess existing on the surface of the water-absorbent resin particle, for example. Hereinafter, an estimation mechanism enabling controlling of the water absorption rate by the coated resin particle of the present invention will be described with reference to FIGS. 1 and 2.

Figure 1:
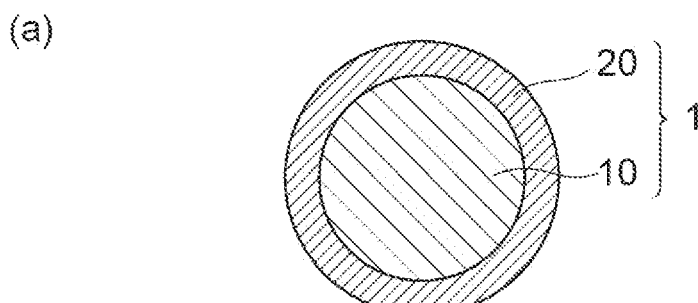
FIG. 1 is a schematic cross-sectional view showing an embodiment of a coated resin particle.
Figure 1:
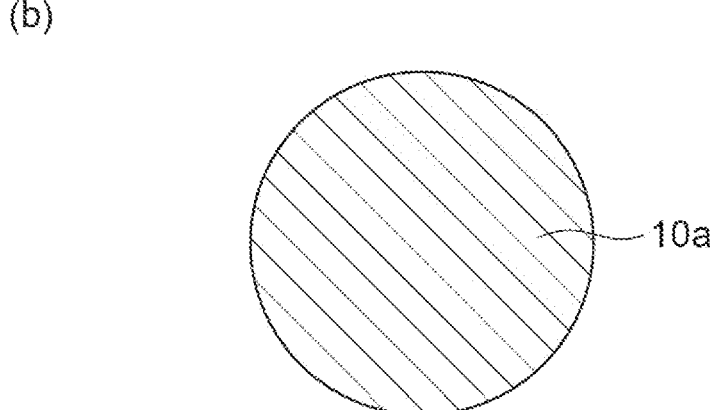

FIG. 1 is a schematic cross-sectional view showing an embodiment of the coated resin particle. As shown in (a) of FIG. 1, a coated resin particle 1 according to the present embodiment includes a water-absorbent resin particle 10, and a coating layer 20 that coats at least a part of the surface of the water-absorbent resin particle 10. In (a) of FIG. 1, the entire surface of the water-absorbent resin particle 10 is coated with the coating layer 20.

Contact with a liquid is blocked by the portion, which is coated with the coating layer 20, of the water-absorbent resin particle 10. Therefore, when the entire surface of the water-absorbent resin particle 10 is coated with the coating layer 20, the water-absorbent resin particle 10 cannot absorb the liquid. On the other hand, although not particularly shown, when a part of the surface of the water-absorbent resin particle 10 is coated with the coating layer 20, the liquid can be absorbed at an exposed portion of the surface of the water-absorbent resin particle 10 (a portion that is not coated with the coating layer 20), but the coating layer 20 functions as a binder that inhibits the swell of the water-absorbent resin particle 10. Accordingly, when the coating layer 20 is provided on at least a part of the surface of the water-absorbent resin particle 10, the water-absorbent resin particle 10 cannot exhibit the original water absorption capacity. However, as described above, since the coating layer 20 contains the water-soluble component in which the solubility in 100 g of water is in the range of 1.0 g or more and 150 g or less at 25° C., when the coated resin particle 1 comes into contact with the liquid, the coating layer 20 is gradually dissolved and disappears. As the coating layer 20 disappears, the water-absorbent resin particle 10 gradually exhibits its original water absorption capacity, and finally becomes a swollen water-absorbent resin particle 10a shown in (b) of FIG. 1.

As described above, in the coated resin particle of the present invention, since the water-absorbent resin particle is coated with a specific coating layer, the water absorption capacity of the water-absorbent resin particle is suppressed. That is, in the coated resin particle, the time until reaching the swelling state is slower than when using only the water-absorbent resin particle constituting the coated resin particle. Hereinafter, changes in the water absorption amount that can be shown in the coated resin particle will be described with reference to FIG. 2.

Figure 2:
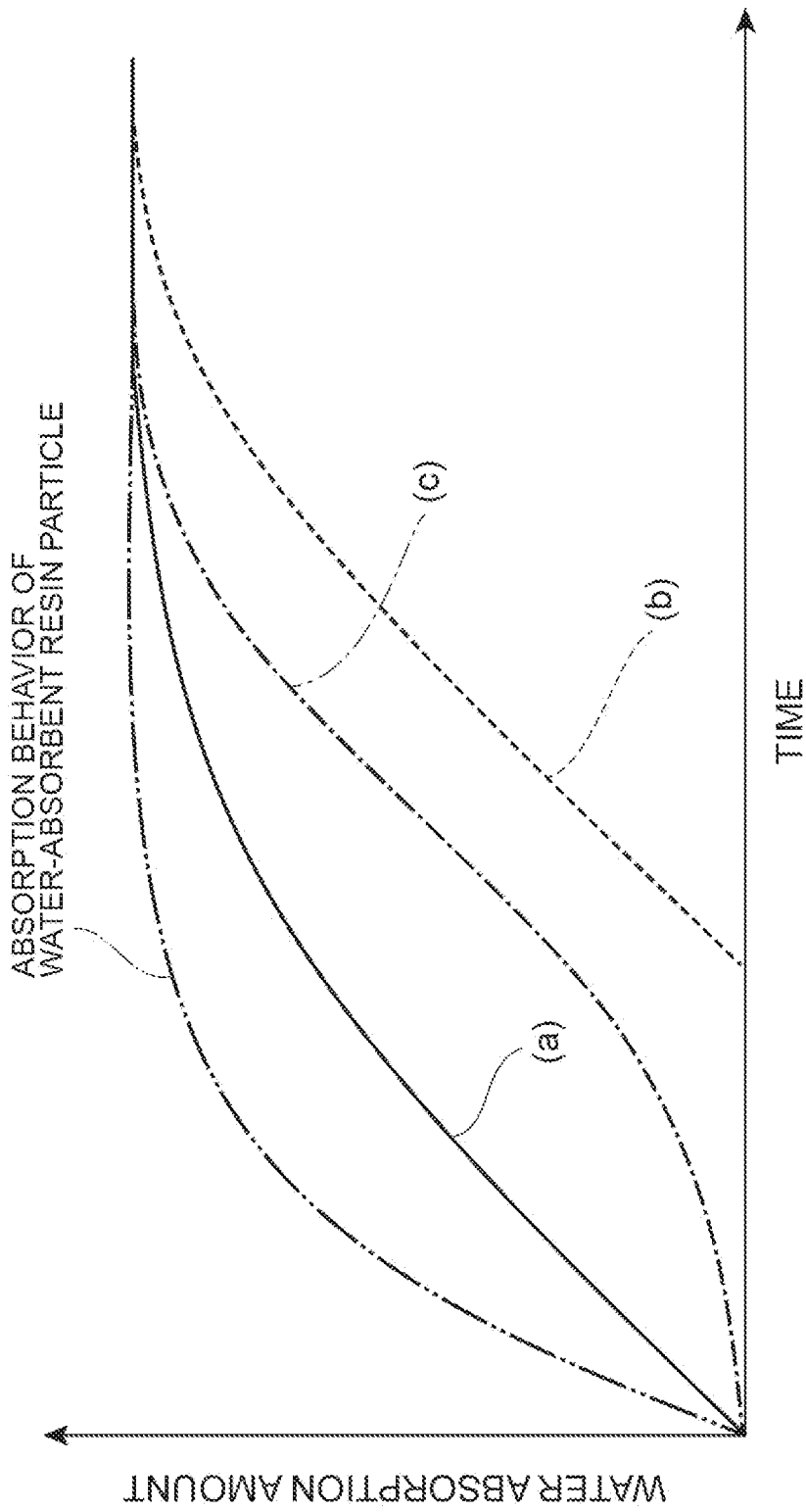
FIG. 2 is a graph showing water absorption behavior of water-absorbent resin particles and coated resin particles.

FIG. 2 is a graph showing changes in the water absorption amount over time (hereinafter, simply referred to as "water absorption behavior") of each of the coated resin particle and the water-absorbent resin particle constituting the coated resin particle after they come into contact with the liquid. FIG. 2 is not a graph obtained by actually measuring specific coated resin particles and water-absorbent resin particles, but is a conceptual diagram showing the concept of the present invention.

For example, the water absorption behavior of the coated resin particle may be one in which "the time in which water absorption is started is the same (the moment when the coated resin particle comes into contact with the liquid), but the time until reaching the swelling state is slower because the water absorption amount is substantially constantly small as compared to the water-absorbent resin particle" as shown in (a) of FIG. 2, may be one in which "the time in which water absorption is started and the time until reaching the swelling state are slower as compared to the water-absorbent resin particle" as shown in (b) of FIG. 2, or may be one in which "the time in which water absorption is started is the same (the moment when the coated resin particle comes into contact with the liquid), but the time until reaching the swelling state is slower as compared to the water-absorbent resin particle because the water absorption amount at the initial stage is extremely small" as shown in (c) of FIG. 2.

As described above, the coated resin particle has a slower water absorption rate than the case of using only the water-absorbent resin particle. Therefore, by using the coated resin particle of the present invention, the occurrence of the gel blocking phenomenon can be effectively prevented as compared to the case of using only the water-absorbent resin particle. For the coated resin particle, it is preferable that the water absorption amount be significantly increased after the lapse of a certain time as shown in (b) or (c) of FIG. 2, and it is more preferable that the liquid be not absorbed until a certain time elapses as shown in (b) of FIG. 2. In particular, because the coated resin particle showing the water absorption behavior as shown in (b) of FIG. 2 does not absorb the liquid until a certain time elapses, the occurrence of the gel blocking phenomenon can be more effectively prevented.

When the coated resin particle shows the water absorption behavior as shown in (b) of FIG. 2, the time in which water absorption is started after the coated resin particle comes into contact with an aqueous solution of 0.9% by mass sodium chloride (hereinafter, simply referred to as "physiological saline") may be 3 to 120 minutes, 5 to 90 minutes, or 10 to 60 minutes, for example. In addition, when the coated resin particle shows the water absorption behavior as shown in (c) of FIG. 2, the time until the coated resin particle exhibits 10% water absorption power after it comes into contact with physiological saline may be 3 to 120 minutes, 5 to 90 minutes, or 10 to 60 minutes, for example. The phrase "exhibiting 10% water absorption power" means absorption of physiological saline corresponding to 10% by mass of the total water absorption amount in the swelling state.

Easily achievable water absorption behavior will be described for each aspect of the coating layer. When the coating layer coats the entire surface of the water-absorbent resin particle, even when the coated resin particle comes into contact with the liquid, water absorption is not started until the coating layer is dissolved and the surface of the water-absorbent resin particle is exposed, and as a result, the coated resin particle is likely to show the water absorption behavior as shown in (b) of FIG. 2. In this case, the time until the coated resin particle starts to absorb water can be appropriately controlled by the forming material and/or the thickness of the coating layer.

On the other hand, when the coating layer coats a part of the surface of the water-absorbent resin particle, water absorption is started at the moment when the coated resin particle comes into contact with the liquid, but the swell of the water-absorbent resin particle is suppressed by the coating layer. Therefore, the coated resin particle cannot exhibit its original water absorption capacity until the coating layer is sufficiently dissolved, and as a result, the water absorption behavior as shown in (a) or (c) of FIG. 2 is likely to be shown. Whether the coated resin particle shows the water absorption behavior (a relatively constant water absorption amount (water absorption rate) per unit time until reaching the swelling state) as shown in (a) of FIG. 2, or shows the water absorption behavior (a rapid increase in the water absorption amount after the lapse of a certain time) as shown in (c) of FIG. 2 can be appropriately controlled by the forming material, the thickness, and/or the coverage of the coating layer.

(Water-Absorbent Resin Particle)

The water-absorbent resin particle is not particularly limited as long as it is composed of a resin having water absorption properties. The water-absorbent resin particle may contain a crosslinking polymer formed by polymerizing a monomer containing an ethylenically unsaturated monomer, for example. The crosslinking polymer can have a monomer unit derived from the ethylenically unsaturated monomer. The water-absorbent resin particle can be produced by a method including a step of polymerizing a monomer containing an ethylenically unsaturated monomer, for example. Examples of the polymerization method include a reverse phase suspension polymerization method, an aqueous solution polymerization method, a bulk polymerization method, and a precipitation polymerization method.

The ethylenically unsaturated monomer may be a water-soluble ethylenically unsaturated monomer (an ethylenically unsaturated monomer having the solubility of 1.0 g or more in 100 g of water at 25° C.). Examples of the water-soluble ethylenically unsaturated monomer include (meth)acrylic acid and a salt thereof, 2-(meth)acrylamide-2-methylpropanesulfonic acid and a salt thereof, (meth)acrylamide, N,N-dimethyl (meth)acrylamide, 2-hydroxyethyl (meth) acrylate, N-methylol (meth)acrylamide, polyethylene glycol mono(meth)acrylate, N,N-diethylaminoethyl (meth)acrylate, N,N-diethylaminopropyl (meth)acrylate, and diethylaminopropyl (meth)acrylamide. In a case where the ethylenically unsaturated monomer has an amino group, the amino group may be quaternized. The ethylenically unsaturated monomer may be used alone, or may be used in combination of two or more kinds thereof.

In a case where the ethylenically unsaturated monomer has an acid group, it may be used in the polymerization reaction after neutralizing the acid group with an alkaline neutralizing agent. The degree of neutralization of the ethylenically unsaturated monomer by the alkaline neutralizing agent is 10 to 100 mol %, 50 to 90 mol %, or 60 to 80 mol % of the acid group in the ethylenically unsaturated monomer, for example.

From the viewpoint of industrial availability, the ethylenically unsaturated monomer may include at least one compound selected from the group consisting of (meth) acrylic acid and a salt thereof, acrylamide, methacrylamide, and N,N-dimethyl acrylamide. The ethylenically unsaturated monomer may include at least one compound selected from the group consisting of (meth)acrylic acid and a salt thereof, and acrylamide.

As the monomer for obtaining the water-absorbent resin particles, a monomer other than the above-mentioned ethylenically unsaturated monomer may be used. Such a monomer can be used by being mixed with an aqueous solution containing the above-mentioned ethylenically unsaturated monomer, for example. The use amount of the ethylenically unsaturated monomer may be 70 to 100 mol % with respect to the total amount of monomers. The ratio of (meth)acrylic acid and a salt thereof may be 70 to 100 mol % with respect to the total amount of the monomers.

Crosslinking by self-crosslinking occurs during polymerization, but crosslinking may be induced by using an internal crosslinking agent. When the internal crosslinking agent is used, water-absorbent characteristics (water retention amount and the like) of the water-absorbent resin particles are easily controlled. The internal crosslinking agent is usually added to a reaction solution during the polymerization reaction.

The water-absorbent resin particle may be one in which crosslinking (surface crosslinking) is performed in the vicinity of the surface. In addition, the water-absorbent resin particles may be constituted of only the polymer particles (crosslinking polymer), but may further contain various additional components selected from a gel stabilizer, a metal chelating agent, and a flowability improver (lubricant), for example. The additional component can be disposed inside the polymer particles, on the surface of the polymer particles, or both thereof. The additional component is preferably a flowability improver (lubricant). The flowability improver may contain inorganic particles. Examples of the inorganic particles include silica particles such as amorphous silica.

The shape of the water-absorbent resin particle is not particularly limited, and for example, it may be substantially spherical, crushed, or granular, or may be a shape in which primary particles having these shapes are aggregated.

The median particle diameter of the water-absorbent resin particle may be 100 to 800 μm, 150 to 700 μm, 200 to 600 μm, or 250 to 500 μm. The median particle diameter is measured by a method described in Examples.

The water absorption amount of physiological saline of the water-absorbent resin particle may be 10 to 100 g/g, 20 to 90 g/g, or 30 to 80 g/g at 25° C., for example. The water absorption amount is measured by a method described in Examples.

(Coating Layer)

The coating layer contains a water-soluble component in which the solubility in 100 g of water is in the range of 1.0 g or more and 150 g or less at 25° C. (hereinafter, simply referred to as "water-soluble component"). By having such a coating layer, the water absorption behavior of the coated resin particle is easily controlled. When the solubility of the water-soluble component is less than 1 g, a long time is required for dissolving the coating layer, which makes it difficult to produce practical coated resin particles. In addition, when the solubility of the water-soluble component exceeds 150 g, the entire coating layer is dissolved within a few seconds after the coated resin particle comes into contact with the liquid, although this depends on the thickness of the coating layer, and there is concern that the water absorption rate cannot be substantially controlled.

The lower limit value of the solubility of the water-soluble component in 100 g of water at 25° C. may be 1.1 g or more, 1.2 g or more, 1.5 g or more, or 2.0 g or more. In addition, the upper limit value of the solubility of the water-soluble component in 100 g of water at 25° C. is preferably 90 g or less, more preferably 80 g or less, further preferably 70 g or less, even further preferably 60 g or less, and particularly preferably 50 g or less. The upper limit value of the solubility may be 40 g or less, 30 g or less, 20 g or less, 10 g or less, or 5 g or less. The solubility is measured by a method described in Examples.

The viscosity of a saturated aqueous solution at 25° C. of the water-soluble component is preferably in the range of 1

Pa·s or more and 2000 Pa·s or less. The lower limit value of the viscosity is more preferably 1.5 Pa·s or more, further preferably 2 Pa·s or more, even further preferably 2.5 Pa·s or more, and particularly preferably 3 Pa·s or more. In addition, the upper limit value of the viscosity is more preferably 1500 Pa·s or less, further preferably 1000 Pa·s or less, even further preferably 750 Pa·s or less, and particularly preferably 500 Pa·s or less.

As the viscosity of the water-soluble component increases, bonding to the surface of the water-absorbent resin particle becomes easier, but the handleability thereof tends to decrease, and also, formation of a coating layer having a uniform thickness tends to become difficult. On the other hand, as the viscosity of the water-soluble component decreases, the handleability is improved, and formation of a coating layer having a uniform thickness becomes easier, but bonding to the surface of the water-absorbent resin particle tends to become difficult. When the viscosity of the water-soluble component is in the above-mentioned range, the water-soluble component can be easily attached to the surface of the water-absorbent resin particle while maintaining an appropriate handleability. The viscosity of the water-soluble component is measured by the following procedure.

<Method of Measuring Viscosity (Pa·s)>

600 g of distilled water, and a specific amount of the water-soluble component according to the solubility (300 g when the solubility is 1 to 50 g, 600 g when the solubility is 50 to 100 g, 900 g when the solubility is 100 to 150 g) are mixed thoroughly at 90° C. for 1 hour to prepare an aqueous solution. After cooling the aqueous solution to 25° C., the insoluble material is removed by filtration using a JIS Z 8801 standard sieve having the opening of 1410 μm, and the filtrate is used as a saturated aqueous solution. The saturated aqueous solution is put to a 500 mL beaker having the inner diameter of 85 mmφ to the height of 85 mm, and the temperature is adjusted to 25° C.±0.5° C. to measure the viscosity using a B-type viscometer thereafter. The value after 60 seconds is converted into the viscosity [Pa·s] of the saturated aqueous solution using a multiplier according to a rotor used and the rotation speed. As the B-type viscometer, VISMETRON VS-H1 type manufactured by SHIBAURA SEMTEK CO., LTD. (former SHIBAURA SYSTEM CO., LTD.) is used. In addition, the rotor of the same company is used.

In terms of easily satisfying the above-mentioned solubility and viscosity, the water-soluble component preferably contains a compound having a hydrophilic group (hereinafter, simply referred to as "hydrophilic group-containing compound"), and is more preferably composed of only the hydrophilic group-containing compound. The hydrophilic group that may be contained in the hydrophilic group-containing compound is at least one group selected from the group consisting of an anionic group, a cationic group, an amphoteric group, and a nonionic group, for example. By appropriately adjusting the type and number of the hydrophilic groups, the solubility and the viscosity of the water-soluble component can be adjusted, and as a result, the water absorption behavior of the coated resin particle can be appropriately controlled.

Examples of the anionic group include a carboxyl group, a sulfonic acid group, and a phosphoric acid group. Examples of the cationic group include an amino group, an imino group, and a quaternary ammonium group. Examples of the amphoteric group include a carbobetaine group, a sulfobetaine group, and a phosphobetaine group. Examples of the nonionic group include a hydroxyl group; an amide group; a cyclic lactam group such as a pyrrolidone group and a caprolactam group; an alkoxy group; and a (poly)oxyalkylene group such as a (poly)oxyethylene group and a (poly)oxypropylene group.

The repetition number of the (poly)oxyalkylene group may be 1 to 150000 or 150 to 100000, for example. The (poly)oxyalkylene group is simply referred to as an oxyalkylene group when the repetition number is 1, and is referred to as a polyoxyalkylene group when the repetition number is 2 or more. The same applies to the various functional groups listed above and included in the (poly)oxyalkylene group. By appropriately adjusting the repetition number, the solubility and the viscosity of the water-soluble component can be appropriately adjusted. The carbon atoms of the (poly) oxyalkylene group may be 1 to 4, or 2 to 3, for example. By appropriately adjusting the carbon atoms, the solubility of the water-soluble component can be appropriately adjusted.

As the compound having a hydroxyl group, polyvinyl alcohol can be exemplified. Examples of the compound having an amide group include polyacrylamide. Examples of the compound having a (poly)oxyalkylene group include polyalkylene oxide, polyalkylene glycol, and polyoxyalkylene alkyl ether.

The hydrophilic group-containing compound is preferably at least one selected from the group consisting of polyvinyl alcohol, polyacrylamide, polyalkylene oxide, polyalkylene glycol, polyoxyalkylene alkyl ether, and a copolymer of monomers constituting these polymers, and is more preferably polyvinyl alcohol, polyethylene oxide, polyethylene glycol, or polyoxyethylene alkyl ether.

It is desirable that the coating layer is substantially constituted of only the water-soluble component, but a component other than the water-soluble component (hereinafter, simply referred to as "another component") may be contained on condition in which the solubility of the entire coating layer in 100 g of water is 1.0 g or more and 150 g or less at 25° C. The other component is a compound in which the solubility in 100 g of water is less than 1.0 g, or more than 150 g at 25° C. When the other component is contained, the ratio of the water-soluble component in the entire coating layer may be 20% by mass or more, 30% by mass or more, or 50% by mass or more, and is preferably 80% by mass or more, more preferably 90% by mass or more, and further preferably 95% by mass or more, for example. When the other component is contained in the coating layer, the water absorption behavior of the coated resin particle can be appropriately controlled. Examples of the other component include inorganic substances such as silica and talc, and organic water-insoluble components (organic compounds in which the solubility in 100 g of water is less than 1.0 g at 25° C.).

Examples of the organic water-insoluble components include polyesters such as polyethylene terephthalate, polybutylene terephthalate, polyethylene naphthalate, and polybutylene naphthalate; polyamides such as nylon 6 and nylon 66; polyolefins such as polyethylene, polypropylene, ethylene-butene copolymers, ethylene-propylene copolymers, copolymers of alkenes and water-soluble ethylenically unsaturated monomers; polyurethanes such as ether-based polyurethane, ester-based polyurethane, and carbonate-based polyurethane; polystyrenes such as poly-α-methylstyrene and syndiotactic polystyrene; polycarbonates such as bisphenol A and polyhexamethylene carbonate; polyacrylates such as trimethylolpropane tri(meth)acrylate, pentaerythritol tri(meth)acrylate, and dipentaerythritol hexa(meth)acrylate; polyacetals such as polyoxymethylene, polyacetaldehyde, polypropionaldehyde, and polybutylaldehyde; halogen-based polymers such as polyvinyl chloride, polyvinyl fluoride, and polyvinylidene fluoride; and polysiloxanes. For the organic water-insoluble component, one kind may be used alone, or a plurality of kinds may be used in combination. In addition, the organic water-insoluble component may be acid-modified because then the water absorption behavior of the coated resin particle is more easily controlled.

As the organic water-insoluble component, polyolefin is preferable, and a copolymer of an alkene and a water-soluble ethylenically unsaturated monomer is more preferable. When the copolymer of an alkene and a water-soluble ethylenically unsaturated monomer is used as the organic water-insoluble component, as the alkene, it is preferable to use at least one alkene selected from ethylene, propylene, and butene, and it is more preferable to use ethylene. In this case, the above-mentioned compound can be used as the water-soluble ethylenically unsaturated monomer, but (meth)acrylic acid and/or a salt thereof is preferably used.

The coating layer may have a one-layer structure or a multilayer structure having two or more layers. For example, the coating layer may have a first layer containing a first water-soluble component, and a second layer containing a second water-soluble component that coats at least a part of the surface of the first layer. When the coating layer has the multilayer structure, the coated resin particle showing more complicated water absorption behavior can be produced.

From the viewpoint of controlling the water absorption behavior of the coated resin particle, the thickness of the coating layer (referring to the total thickness in which the thicknesses of each layer are totaled when the coating layer has the multilayer structure) may be 0.001 to 100 μm, 0.01 to 50 μm, or 0.1 to 30 μm. The thickness of the coating layer can be calculated by observing the cross section of the coated resin particle using an optical microscope. Specifically, it is calculated by performing cross section processing of the coated resin particle with an ultramicrotome, and thereafter observing the cross section using an optical microscope "SZX16" (manufactured by Olympus Corporation) and a confocal microscope OPTELEICS HYBRID (manufactured by Lasertec Corporation).

The coating layer may coat at least a part of the surface of the water-absorbent resin particle, and the water absorption behavior of the coated resin particle can be controlled according to the coverage. The coverage of the surface of the water-absorbent resin particle by the coating layer may be 30% or more, 40% or more, or 50% or more, and may be 100% or less, 90% or less, or 80% or less. The coverage is calculated by RAMAN touch (manufactured by Nanophoton Corporation).

The coated resin particle of the present invention coats at least a part of the surface of the water-absorbent resin particle by the coating layer containing the water-soluble component. Therefore, the water-absorbent resin particle cannot exhibit its original water absorption capacity until most or all of the water-soluble components are dissolved in the liquid. Accordingly, the time until reaching the swelling state is slowed down as compared to the case using the water-absorbent resin particle which is the constituent material of the coated resin particle alone, and as a result, the occurrence of the gel blocking phenomenon can be prevented. In particular, the coated resin particle of the present invention can be easily produced by providing the coating layer on the surface of the water-absorbent resin particle. Therefore, using a complicated method of changing the polymerization conditions of the water-absorbent resin particle as in the conventional case is not required.

The water absorption rate (cm) of physiological saline of the coated resin particle can be measured by a method described in Examples. The water absorption rate of the coated resin particle at 25° C. after 1 minute is preferably 1.7 cm or less, and may be 1.6 cm or less, 1.5 cm or less, or 1.4 cm or less. The water absorption rate of the coated resin particle at 25° C. after 5 minutes is preferably 4.5 cm or less, and may be 4.4 cm or less, 4.3 cm or less, or 4.2 cm or less.

The coated resin particle of the present invention can be used alone, but can be used as a mixed particle by mixing with a water-absorbent resin particle other than the coated resin particle (hereinafter, simply referred to as "another water-absorbent resin particle"). By using the mixed particle, the time until reaching the swelling state can be slowed down as compared to the case using the other water-absorbent resin particle alone, and as a result, the occurrence of the gel blocking phenomenon can be prevented. In addition, when using the mixed particle, arbitrary water absorption behavior can be realized by appropriately changing the type of the coated resin particles, the type of the other water-absorbent resin particles, the mixing ratio of the coated resin particles and the other water-absorbent resin particles, and the like.

[Method for Producing Coated Resin Particle]

A method for producing the coated resin particle of the present invention includes mixing the water-absorbent resin particle, and the coating material containing the water-soluble component in which the solubility in 100 g of water is in the range of 1.0 g to 150 g at 25° C. to form the coating layer on at least a part of the surface of the above-mentioned water-absorbent resin particle.

The coating material is a compound containing the water-soluble component capable of forming the above-mentioned coating layer. The coating material may be provided in a solid form to be mixed with the water-absorbent resin particle, or may be provided in a liquid form to be mixed with the water-absorbent resin. Hereinafter, a specific method for producing the coated resin particle will be described for each state of the coating material.

<Case of Using Coating Material in Solid Form>

When using the coating material in the solid form, the coating material can be pressure-bonded to the surface of the water-absorbent resin particle using a particle composing machine to form the coating layer. Specifically, predetermined amounts of the water-absorbent resin particles and the solid (for example, powdery) coating material are injected to the particle composing machine. Thereafter, stress (compressive stress and shear stress) is applied to the water-absorbent resin particles and the coating material by the rotation of a stirring blade provided in the machine, and the coating material is pressure-bonded to the surfaces of the water-absorbent resin particle by the stress to produce the coated resin particles.

In this case, the thickness, the coverage, and the like of the coating layer can be arbitrarily adjusted by appropriately adjusting the amounts of the water-absorbent resin particles and the coating material to be injected to the particle composing machine. The water-absorbent resin particles and the coating material may be separately injected to the particle composing machine, but the water-absorbent resin particles and the coating material are preferably injected to the particle composing machine in a state where they are previously mixed because then more uniform coating can be expected. When using the particle composing machine, the coated resin particle in which a part of the surface of the water-absorbent resin particle is coated with the coating layer is easily obtained, and therefore, it is thought that the coated resin particle is likely to show the water absorption behavior as in (a) or (c) of FIG. 2. As the particle composing machine, for example, a particle composing machine NOBILTA MINI (manufactured by Sugino Machine Limited) can be used.

<Case of Using Coating Material in Liquid Form>

The coating material in the liquid form (hereinafter, simply referred to as "coating liquid") can be obtained by melting the coating material, or by dissolving or dispersing the coating material in an arbitrary solvent or dispersion medium. The coating liquid is preferably obtained by dissolving or dispersing the coating material in an arbitrary solvent or dispersion medium because then the coating layer having a uniform thickness is easily formed.

Examples of the solvent include water, hydrophilic solvents, and mixed solvents of water and a hydrophilic solvent. The hydrophilic solvent is a solvent is dissolved substantially uniformly in water. Examples of the hydrophilic solvent include alcohols such as methanol and isopropyl alcohol; glycols such as ethylene glycol; cellosolves such as methyl cellosolve and ethyl cellosolve; ketones such as acetone and methyl ethyl ketone; esters such as ethyl acetate; and ethers such as tetrahydrofuran. The hydrophilic solvent may be used alone, or may be used in combination of two or more kinds thereof.

As the dispersion medium, a hydrocarbon dispersion medium is preferably used. Examples of hydrocarbon dispersion media include chain aliphatic hydrocarbons such as n-hexane, n-heptane, 2-methylhexane, 3-methylhexane, 2,3-dimethylpentane, 3-ethylpentane, and n-octane; alicyclic hydrocarbons such as cyclohexane, methylcyclohexane, cyclopentane, methylcyclopentane, trans-1,2-dimethylcyclopentane, cis-1,3-dimethylcyclopentane, and trans-1,3-dimethylcyclopentane; and aromatic hydrocarbons such as benzene, toluene, and xylene. The hydrocarbon dispersion medium may be used alone, or may be used in combination of two or more kinds thereof.

The concentration of the coating material in the coating liquid is not particularly limited, and can be appropriately adjusted in consideration of the amount of the water-absorbent resin particle to be coated in order to obtain the coating layer having a target thickness, but the concentration may be 1% to 50% by mass, 3% to 30% by mass, or 5% to 20% by mass, for example.

When using the coating liquid, the coating layer can be formed by (1) a method of adding the coating liquid to the hydrocarbon dispersion medium in which the water-absorbent resin particles are dispersed, (2) a method of adding the coating liquid and the water-absorbent resin particles in the hydrocarbon dispersion medium substantially at the same time, or (3) a method of bringing the coating liquid into contact with the water-absorbent resin particles in a dry state, for example. Hereinafter, each method will be specifically described.

An example of the above-mentioned method (1) will be described. First, a separable flask equipped with a reflux cooling device, a dropping funnel, a nitrogen gas introduction tube, and a stirrer is prepared. Subsequently, the hydrocarbon dispersion medium and the water-absorbent resin particles are injected to the separable flask, and the mixture is sufficiently stirred while maintaining a high temperature (for example, 60° C. to 80° C.). On the other hand, the solvent or dispersion medium, and the coating material are added to a beaker and mixed to prepare the coating liquid. The coating liquid is added into the above-mentioned separable flask and sufficiently stirred, and thereafter, the separable flask is immersed in an oil bath set at a high temperature (for example, 100° C. to 125° C.), and water that may be contained in the reaction system is extracted to the outside of the system while refluxing the hydrocarbon dispersion medium by azeotropic distillation of the hydrocarbon dispersion medium and water. Thereafter, by evaporating the hydrocarbon dispersion medium, the coated resin particles in which the coating material is coated on the surfaces of the water-absorbent resin particles are obtained.

An example of the above-mentioned method (2) will be described. First, a separable flask equipped with a reflux cooling device, a dropping funnel, a nitrogen gas introduction tube, and a stirrer is prepared. Subsequently, the hydrocarbon dispersion medium, the water-absorbent resin particles, and the coating liquid are injected to the separable flask, and the mixture is sufficiently stirred while maintaining a high temperature (for example, 60° C. to 80° C.). Thereafter, by evaporating the hydrocarbon dispersion medium, the coated resin particles in which the coating material is coated on the surfaces of the water-absorbent resin particles are obtained.

There are various methods for the above-mentioned method (3), but (3-1) a method using an eggplant flask, (3-2) a method using a sprayer, and (3-3) a method using various granulators will be described below as representative examples thereof.

(3-1)

The coating liquid is injected to the eggplant flask, and subsequently the water-absorbent resin particles are injected. The eggplant flask is attached to an evaporator, and heated while rotating to distill off the solvent or dispersion medium contained in the coating liquid under reduced pressure conditions. Thus, the coated resin particles in which the coating material is coated on the surfaces of the water-absorbent resin particles are obtained.

(3-2)

The water-absorbent resin particles are added to a separable flask equipped with a stirrer blade and stirred. The coating liquid is sprayed on the water-absorbent resin particles wound up by stirring with the stirrer blade. Spraying of the coating liquid can be performed using a two-fluid nozzle, for example. It is desirable that the coating liquid is atomized by a stream of an inert gas such as nitrogen and sprayed, because then uniform coating can be expected. Thereafter, the contents of the separable flask are taken out, heated by a hot-air dryer, and thereafter cooled to room temperature to obtain the coated resin particles.

(3-3)

Examples of the granulators used for producing the coated resin particles include a rolling granulator, a stirring granulator, and a fluid bed granulator.

When using the rolling granulator, an inclined shallow circular container equipped in the rolling granulator is rotated, the water-absorbent resin particles are supplied to the circular container, and also, an appropriate amount of the coating liquid is added. Then, by the solvent or dispersion medium contained in the coating liquid, while parts of the water-absorbent resin particles during oscillation aggregate, the coating layer is formed on the surface thereof. A step of adding the water-absorbent resin particles and the coating liquid may be performed a plurality of times if necessary.

When using the stirring granulator, the water-absorbent resin particles are injected to a mixer equipped in the stirring granulator, to perform mixing by stirring and also adding the coating liquid. Then, by the solvent or dispersion medium contained in the coating liquid, while parts of the water-absorbent resin particles during stirring aggregate, the coating layer is formed on the surface thereof. A step of adding the water-absorbent resin particles and the coating liquid may be performed a plurality of times if necessary. Excessive aggregation of the water-absorbent resin particles can be prevented by controlling the shearing force of the mixer.

When using the fluid bed granulator, first, the water-absorbent resin particles are injected to a container that is equipped in the fluid bed granulator and can send hot air from the lower part to previously fluidize the water-absorbent resin particles. Thereafter, when the coating liquid is scattered from a nozzle equipped in the container, by the solvent or dispersion medium contained in the coating liquid, while parts of the water-absorbent resin particles during stirring aggregate, the coating layer is formed on the surface thereof. The coating liquid may be scattered a plurality of times if necessary. Excessive aggregation of the water-absorbent resin particles can be prevented by adjusting the scattering amount and the scattering frequency of the coating liquid. As the fluid bed granulator, for example, a fluid bed granulator FBD/SG (manufactured by YENCHEN MACHINERY CO., LTD.) can be used.

It is thought that when the coating layer is formed using the coating liquid, because the coating material is likely to come into contact with the water-absorbent resin particles without unevenness, the coating layer is likely to be formed on the entire surface thereof. In particular, it is thought that in the above-mentioned methods (1), (2), and (3) using the fluid bed granulator, the coating layer having a more uniform thickness is easily obtained as compared to the other methods.

EXAMPLES

Hereinafter, the present invention will be more specifically described with reference to examples. However, the present invention is not limited to these examples.
(Production of Water-Absorbent Resin Particles)

A round-bottomed cylindrical separable flask with the inner diameter of 11 cm and the internal volume of 2 L equipped with a reflux cooling device, a dropping funnel, a nitrogen gas introduction tube, and a stirrer (a stirrer blade having two stages of four inclined paddle blades having the blade diameter of 5 cm) was prepared. To this flask, 293 g of n-heptane and 0.736 g of a maleic anhydride-modified ethylene-propylene copolymer (dispersant, Mitsui Chemicals, Inc., Hi-Wax 1105A) were added to obtain a mixture. After dissolving the dispersant in n-heptane by raising the temperature to 80° C. while stirring this mixture, the mixture was cooled to 50° C.

Subsequently, 92.0 g of an aqueous solution of 80.5% by mass acrylic acid (acrylic acid: 1.03 mol) was put to a beaker having the internal volume of 300 mL as a water-soluble ethylenically unsaturated monomer. Subsequently, while cooling from the outside, 147.7 g of an aqueous solution of 20.9% by mass sodium hydroxide was added dropwise to the beaker to neutralize 75 mol % of acrylic acid. Thereafter, 0.092 g of hydroxyethyl cellulose (manufactured by Sumitomo Seika Chemicals Co., Ltd., HEC AW-15F) as a thickener, 0.0736 g (0.272 mmol) of potassium persulfate as a water-soluble radical polymerization initiator, and 0.010 g (0.057 mmol) of ethylene glycol diglycidyl ether as an internal crosslinking agent were added and then dissolved to prepare a first stage aqueous solution.

The above-mentioned first stage aqueous solution was added to the above-mentioned separable flask, and thereafter stirring was performed for 10 minutes. Thereafter, a reaction solution was obtained by adding, to the separable flask, a surfactant solution obtained by dissolving 0.736 g of sucrose stearic acid ester (surfactant, Mitsubishi-Chemical Foods Corporation, Ryoto Sugar Ester S-370, HLB: 3) in 6.62 g of n-heptane. Then, the inside of the system was sufficiently replaced with nitrogen while stirring the reaction solution at the rotation speed of 550 rpm of the stirrer. Thereafter, the separable flask was immersed in a water bath at 70° C. to raise the temperature of the reaction solution, and a polymerization reaction was advanced for 60 minutes to obtain a first stage polymerization slurry solution.

Subsequently, 128.8 g of an aqueous solution of 80.5% by mass acrylic acid (acrylic acid: 1.43 mol) was put to another beaker having the internal volume of 500 mL as a water-soluble ethylenically unsaturated monomer. Subsequently, while cooling from the outside, 159.0 g of an aqueous solution of 27% by mass sodium hydroxide was added dropwise to the beaker to neutralize 75 mol % of acrylic acid. Thereafter, 0.103 g (0.381 mmol) of potassium persulfate as a water-soluble radical polymerization initiator and 0.0116 g (0.067 mmol) of ethylene glycol diglycidyl ether as an internal crosslinking agent were added to the beaker containing the aqueous solution of acrylic acid, and then dissolved to prepare a second stage aqueous liquid.

While stirring at the rotation speed of 1000 rpm of the stirrer, the first stage polymerization slurry solution in the above-mentioned flask was cooled to 25° C., and the total amount of the second stage aqueous solution was added. After replacing the inside of the flask with nitrogen for 30 minutes, the flask was immersed in a water bath at 70° C. again to raise the temperature of the reaction solution, and a second stage polymerization reaction was performed for 60 minutes to obtain a hydrogel-like polymer. Thereafter, the above-mentioned flask was immersed in an oil bath set at 125° C., and 257.7 g of water was extracted to the outside of the system by azeotropic distillation of n-heptane and water. Subsequently, 4.42 g (0.507 mmol) of an aqueous solution of 2% by mass ethylene glycol diglycidyl ether was added to the flask as a surface crosslinking agent, and the mixture was maintained at 83° C. for 2 hours.

Thereafter, the temperature of the second stage reaction mixture was raised in an oil bath at 125° C., and 245 g of water was extracted to the outside of the system while refluxing n-heptane by azeotropic distillation of n-heptane and water. Then, drying was performed by evaporating n-heptane at 125° C. to obtain a dried product (polymerization product). This dried product was passed through a sieve having the opening of 850 μm to obtain 236.8 g of water-absorbent resin particles in the form of aggregated spherical particles.

Example 1

As a coating material, polyethylene oxide (Sumitomo Seika Chemicals Co., Ltd., PEO-1) was prepared. 7.5 g of the polyethylene oxide was mixed with 150 g of distilled water to prepare a coating liquid.

A round-bottomed cylindrical separable flask with the inner diameter of 11 cm and the internal volume of 2 L equipped with a reflux cooling device, a nitrogen gas introduction tube, and a stirrer (a stirrer blade having two stages of four inclined paddle blades having the blade diameter of 5 cm) was prepared. 300 g of n-heptane and 25 g of the water-absorbent resin particles were injected to the above-mentioned flask, and while stirring at 1000 rpm, the temperature was raised to 80° C. to disperse the water-absorbent resin particles in n-heptane. The coating liquid was added to the dispersion liquid and stirred for 10 minutes.

Subsequently, the flask was immersed in an oil bath set at 125° C., and 140 g of water was extracted to the outside of the system while refluxing n-heptane by azeotropic distillation of n-heptane and water. Thereafter, n-heptane was removed at 125° C. to obtain a precursor material of coated resin particles. This precursor was passed through a sieve having the opening of 850 μm to obtain 5 g of coated resin particles.

Example 2

As a coating material, polyoxyethylene stearyl ether (Nihon Emulsion Co., Ltd., EMALEX625) was prepared.

250 g of n-heptane, 100 g of the water-absorbent resin particles, and 10 g of the polyoxyethylene stearyl ether were injected to the same flask as in Example 1, and stirred at 1000 rpm at 85° C. for 10 minutes. Subsequently, the flask was immersed in an oil bath set at 125° C., and n-heptane was removed at 125° C. to obtain a precursor of coated resin particles. This precursor was passed through a sieve having the opening of 850 μm to obtain 88 g of coated resin particles.

Example 3

As a coating material, polyvinyl alcohol (Kuraray Co., Ltd., KURARAY POVAL 3-98) was prepared. 150 g of the polyvinyl alcohol was mixed with 1995 g of distilled water and 855 g of ethanol to prepare a coating liquid.

500 g of the water-absorbent resin particles was injected to a container of a fluid bed granulator (POWREX CORPORATION, FD-MP-01), and hot air at 60° C. was blown from the lower part of the container. While drying 3000 g of the coating liquid, it was sprayed on the water-absorbent resin particles wound up by blowing. After spraying the coating liquid, it was dried at 60° C. for 30 minutes to obtain a precursor of coated resin particles. This precursor was passed through a sieve having the opening of 850 μm to obtain 575 g of coated resin particles.

Example 4

As a coating material, polyethylene glycol (Tokyo Chemical Industry Co., Ltd., PEG 6000) was prepared. A liquid in which 600 g of the polyethylene glycol was mixed with 2700 g of distilled water was injected to a spraying tank with a stirrer, and 2700 g of ethanol was further injected to prepare a coating liquid.

3000 g of the water-absorbent resin particles was injected to a container of a fluid bed granulator (POWREX CORPORATION, MP-01 mini), and air was blown from the lower part of the container. While drying 6000 g of the coating liquid, it was sprayed on the water-absorbent resin particles wound up by hot air at 50° C. After spraying the coating liquid, it was dried at 50° C. for 30 minutes to obtain a precursor of coated resin particles. This precursor was passed through a sieve having the opening of 850 μm to obtain 2998 g of coated resin particles.

Example 5

As a coating material, an ethylene-sodium acrylate copolymer (Sumitomo Seika Chemicals Co., Ltd., ZAIKTHENE N) and polyethylene glycol (Tokyo Chemical Industry Co., Ltd., PEG 6000) were prepared. 525 g of distilled water, 200 g of an aqueous dispersion emulsion of 25% by mass of the ethylene-sodium acrylate copolymer, and 25 g of the polyethylene glycol were mixed to prepare a coating liquid (containing the ethylene-sodium acrylate copolymer and the polyethylene glycol in 2:1 (mass ratio)).

500 g of the water-absorbent resin particles was injected to a container of a fluid bed granulator (POWREX CORPORATION, FD-MP-01), and hot air at 50° C. was blown from the lower part of the container. While drying 750 g of the coating liquid, it was sprayed on the water-absorbent resin particles wound up by blowing. After spraying the coating liquid, it was dried at 50° C. for 30 minutes to obtain a precursor of coated resin particles. This precursor was passed through a sieve having the opening of 850 μm to obtain 506 g of coated resin particles.

Comparative Example 1

The water-absorbent resin particles were used as they were without forming a coating layer.

The following evaluation was performed on the water-absorbent resin particles and the coated resin particles. The results are shown in Table 1.

<Method of Calculating Ratio of Coating Material>

The ratio of the coating material in the production of the coated resin particles was calculated by the following formula.

$$\text{Ratio of coating material (\% by mass)} = \{\text{mass of coating material provided to form coating layer}/(\text{mass of water-absorbent resin particles provided to form coating layer} + \text{mass of coating material provided to form coating layer})\} \times 100$$

<Method of Measuring Solubility of Coating Material>

5 g of the coating material in the solid form having an appropriate size was prepared for easy measurement when measuring the solubility of the coating material, and this was added to 100 g of distilled water to prepare a measurement solution.

Measurement Solutions of Examples 1 to 4

100 g of distilled water at 25° C. was put to a 200 mL beaker and stirred at 600 rpm using a rotor (8 mm×30 mm, no ring). The coating material was classified, and 5 g of the coating material passed through a sieve having the opening of 850 μm and remained on a sieve having the opening of 75 μm was put to the beaker and stirred for 1 hour to obtain a mixed solution. The mixed solution was suction-filtered using a 34 μm stainless steel wire mesh. The filtrate was recovered and used as the measurement solution.

Measurement Solution of Example 5

100 g of the aqueous dispersion emulsion of 25% of the ethylene-sodium acrylate copolymer was put to a Teflon-coated vat (bottom dimension 250×185 mm), and a lid was put by covering with aluminum foil. The aluminum foil was perforated, and drying was performed with a hot-air dryer (ADVANTEC, FV-320) at 60° C. for 1 hour and subsequently at 80° C. for 1 hour to obtain a polymer film of the ethylene-sodium acrylate copolymer. The polymer film was cut into small pieces with scissors and put to a Teflon-coated vat, and a lid was put by covering with aluminum foil. The aluminum foil was perforated, and heating was performed with a hot-air dryer (FV-320) at 105° C. for 2 hours for complete drying to obtain 22.5 g of the ethylene-sodium acrylate copolymer in a solid form.

Each of the polyethylene glycol and the ethylene-sodium acrylate copolymer was classified, and 1.67 g of the polyethylene glycol and 3.33 g of the ethylene-sodium acrylate copolymer which passed through a sieve having the opening of 850 μm and remained on a sieve having the opening of 75 μm were mixed to obtain 5 g of a coating material (containing the ethylene-sodium acrylate copolymer and the polyethylene glycol in 2:1 (mass ratio)). Using 5 g of the coating material, the measurement solution was obtained by the same procedure as the preparation of the measurement solutions of Examples 1 to 4.

(Calculation of Solubility)

60 g of the measurement solution was put to a weighed 100 mL beaker and dried with a hot-air dryer (FV-320) at 140° C. for 15 hours to measure the mass (Ws) of the solid contents contained in the measurement solution. The solubility of the coating material in 100 g of water was calculated by the following formula.

$$\text{Solubility (g)} = (Ws/60) \times 100$$

(Physiological Saline Saturated Water Absorption Amount)

2.0 g of the water-absorbent resin particles was dispersed in 500 g of physiological saline in a beaker with the capacity of 500 mL, and swollen by stirring at 600 rpm for 1 hour. Thereafter, the mass (Wa) of a JIS standard metal sieve having the opening of 75 μm was measured, and the aqueous solution containing the swollen gel was filtered through the metal sieve. The metal sieve was left to stand for 30 minutes in a state of being tilted so that the angle formed with respect to the horizontal was about 30 degrees, and excess physiological saline was removed. The mass (Wb) of the metal sieve containing the swollen gel was measured, and the water absorption amount was calculated from the following formula.

$$\text{Water absorption amount (g/g)} = [Wb - Wa]/2.0$$

(Water Retention Amount of Physiological Saline)

2.0 g of the water-absorbent resin particles or coated resin particles was dispersed in 500 g of physiological saline in a beaker with the capacity of 500 mL, and swollen by stirring at 600 rpm for 30 minutes. The swollen gel was poured to a cotton bag (cotton broadcloth No. 60, width 100 mm/length 200 mm), the upper part of the cotton bag was bound with a rubber band, and dehydration was performed for 1 minute using a dehydrator (manufactured by KOKU- SAN Co., Ltd., product number: H-122) which had been set to have the centrifugal force of 167 G to measure the mass Wc [g] of the cotton bag containing the swollen gel after dehydration. The same operation was performed without addition of the water-absorbent resin particles or coated resin particles, the empty mass Wd [g] at the time when the cotton bag was wet was measured, and the water retention amount of physiological saline was calculated from the following formula.

$$\text{Water retention amount (g/g)} = [Wc - Wd]/2.0$$

(Median Particle Diameter)

The particle size distribution of 5 g of the water-absorbent resin particles and 5 g of the coated resin particles was measured using an Automated Sonic Sieving Particle Size Analyzer (Robot Sifter RPS-205, manufactured by SEISHIN ENTERPRISE Co., Ltd.), JIS standard sieves having the openings of 710 μm, 600 μm, 500 μm, 425 μm, 300 μm, 250 μm, and 150 μm, and a tray. The relationship between the opening of the sieve and the integrated value of the mass percentage of the particles remaining on the sieve was plotted on a logarithmic probability paper by integrating in the order from the one having the largest particle diameter on the sieve with respect to this particle size distribution. By connecting the plots on the probability paper with a straight line, the particle diameter corresponding to the cumulative mass percentage of 50% by mass was obtained as the median particle diameter.

(Water Absorption Rate)

0.200 g of the water-absorbent resin particles or coated resin particles was precisely weighed and laid on the bottom of an acrylic cylinder with the inner diameter of 2.0 cm and the depth of 8.0 cm, and a height H0 of the layer of the water-absorbent resin particles or coated resin particles was measured at 25° C. Subsequently, 20 g of physiological saline was poured from the upper part of the acrylic cylinder. A height Hn of the layer of the water-absorbent resin particles or coated resin particles was measured after n minutes (after 1 minute and after 5 minutes) from the time when the total amount of the physiological saline was put. The water absorption rates after 1 minute and after 5 minutes were calculated from the following formula.

$$\text{Water absorption rate (cm)} = Hn - H0$$

TABLE 1

| | | Comparative Example | Example | | | | |
|---|---|---|---|---|---|---|---|
| | | 1 | 1 | 2 | 3 | 4 | 5 |
| Ratio of coating material (% by mass) | | — | 23 | 9 | 23 | 17 | 13 |
| Solubility (g) | | — | 3.8 | 4.0 | 1.1 | 4.1 | 1.3 |
| Water absorption amount (g/g) | | 58 | — | — | — | — | — |
| Water retention amount (g/g) | | 39 | 36 | 39 | 32 | 42 | 35 |
| Median particle diameter (μm) | | 369 | 606 | 354 | 392 | 394 | 394 |
| Water absorption rate (cm) | After 1 minute | 1.8 | 0.7 | 0.9 | 0.2 | 1.3 | 1.1 |
| | After 5 minutes | 4.6 | 2.7 | 4.2 | 2.6 | 3.8 | 4.2 |

REFERENCE SIGNS LIST

1 . . . coated resin particle,
10, 10*a* . . . water-absorbent resin particle,
20 . . . coating layer.
The invention claimed is:

1. A coated resin particle comprising:

a water-absorbent resin particle; and a coating layer that coats at least a part of a surface of the water-absorbent resin particle, wherein the coating layer is chemically and/or physically bonded to the surface of the water-absorbent resin particle, the coating layer contains a water-soluble component in which a solubility in 100 g of water is in a range of 1.0 g or more and 5 g or less at 25° C., and an organic water-insoluble component with a solubility in 100 g of water of less than 1.0 g at 25° C., the water-absorbent resin particle contains a crosslinking polymer having a monomer unit derived from an ethylenically unsaturated monomer, and the ethylenically unsaturated monomer contains at least one selected from the group consisting of (meth) acrylic acid and a salt thereof, and the degree of neutralization of the acid group in the ethylenically unsaturated monomer is 50 to 90 mol %, the organic water-insoluble component comprises a copolymer of an alkene and a water-soluble ethylenically unsaturated monomer, wherein the alkene is at least one selected from ethylene, propylene, and butene, and the water-soluble component comprises a compound that is at least one selected from the group consisting of polyalkylene oxide, polyalkylene glycol, polyoxyalkylene alkyl ether, and a copolymer of monomers constituting these polymers.

2. The coated resin particle according to claim 1, wherein the water-soluble component contains a compound having a hydrophilic group, and the compound has at least one group selected from the group consisting of an anionic group, a cationic group, an amphoteric group, and a nonionic group.

3. The coated resin particle according to claim 1, wherein the water-soluble component contains a compound having a hydrophilic group, and the compound has at least one group selected from the group consisting of a hydroxyl group and a (poly) oxyalkylene group.

4. The coated resin particle according to claim 1, wherein a water absorption amount of the water-absorbent resin particle is 10 to 100 g/g at 25° C.

5. The coated resin particle according to claim 1, wherein the coating layer includes a coating material, and the resin particle is formed by applying the coating material to the water-absorbent resin particle.

6. The coated resin particle according to claim 5, wherein the coating material is applied in a solid form.

7. The coated resin particle according to claim 6, wherein the coating material is applied in a liquid form.

8. The coated resin particle according to claim 1, wherein a water absorption rate of physiological saline of the coated resin particle at 25° C. after 1 minute is 1.7 cm or less.

9. A method for producing the coated resin particle according to claim 1, the method comprising mixing a water-absorbent resin particle, and a coating material containing a water-soluble component in which a solubility in 100 g of water is in the range of 1.0 or more and 5 g or less at 25° C. and an organic water-insoluble component with a solubility in 100 g of water of less than 1.0 g at 25° C. to form a coating layer on at least a part of a surface of the water-absorbent resin particle.

* * * * *